United States Patent [19]

Hisano

[11] Patent Number: 5,027,386
[45] Date of Patent: Jun. 25, 1991

[54] LAN INTERFACED FACSIMILE MACHINE

[75] Inventor: Kyosuke Hisano, Yamato, Japan

[73] Assignee: Ricoh Company, Ltd., Tokyo, Japan

[21] Appl. No.: 324,557

[22] Filed: Mar. 16, 1989

[30] Foreign Application Priority Data

Mar. 16, 1988 [JP] Japan .................... 63-62858

[51] Int. Cl.$^5$ .............................................. H04N 1/00
[52] U.S. Cl. ........................................ 379/100; 379/94
[58] Field of Search ......................... 379/100, 93, 94; 358/402, 403, 407, 408, 444

[56] References Cited

U.S. PATENT DOCUMENTS

| | | | |
|---|---|---|---|
| 4,321,703 | 3/1982 | Schwäertzel et al. | 370/89 |
| 4,573,083 | 2/1986 | Shimizu | 358/257 |
| 4,586,086 | 4/1986 | Ohzeki | 358/256 |
| 4,746,986 | 5/1988 | Tanigawa | 358/256 |
| 4,751,727 | 6/1988 | Brahm et al. | 379/94 |

Primary Examiner—Jin F. Ng
Assistant Examiner—Stella L. Woo
Attorney, Agent, or Firm—Oblon, Spivak, McClelland, Maier & Neustadt

[57] ABSTRACT

A plurality of facsimile machines each having a LAN interface function are connected to a LAN. The memory unit of each of the facsimile machines is shared by all of the facsimile machines. Thus, if the memory unit of one of the facsimile machines is full, information may be stored in the memory unit of one of the remaining facsimile machines through the LAN. If the plotter fails, received image information may be transferred to any other facsimile machine having an operative plotter through the LAN to have the received image information recorded on recording paper.

2 Claims, 7 Drawing Sheets

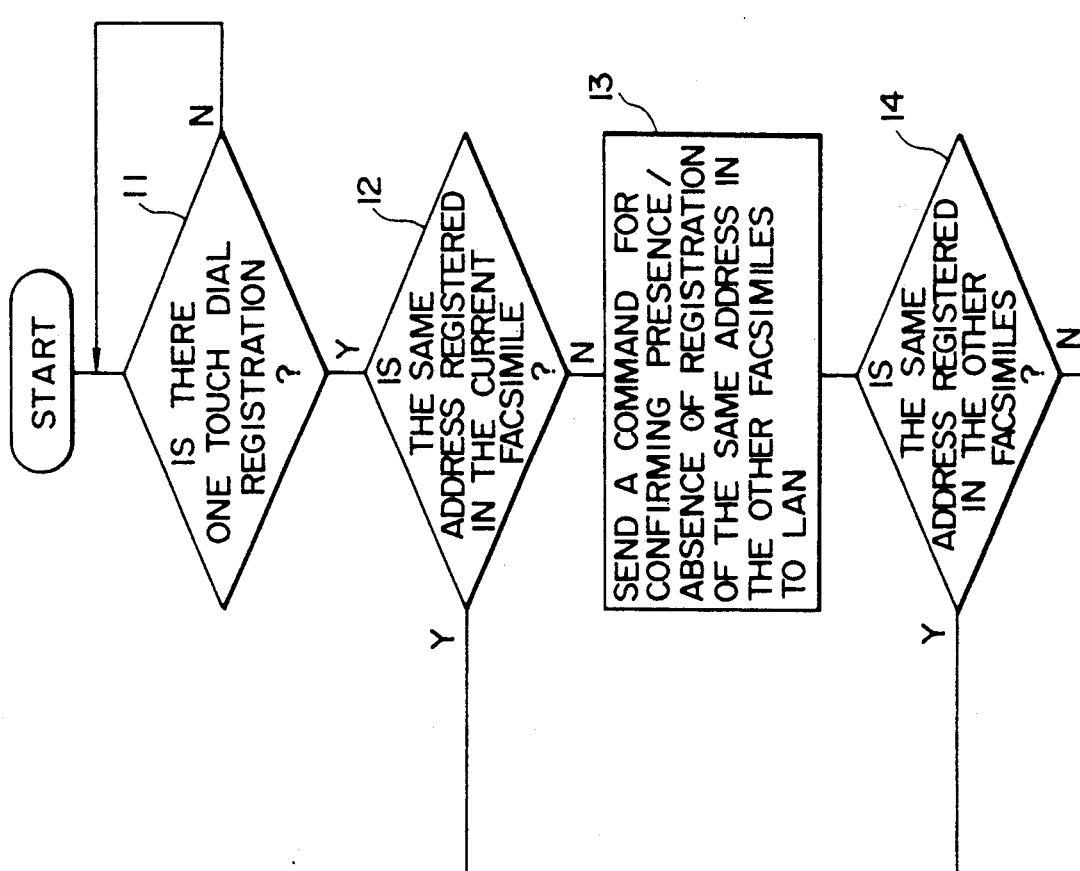

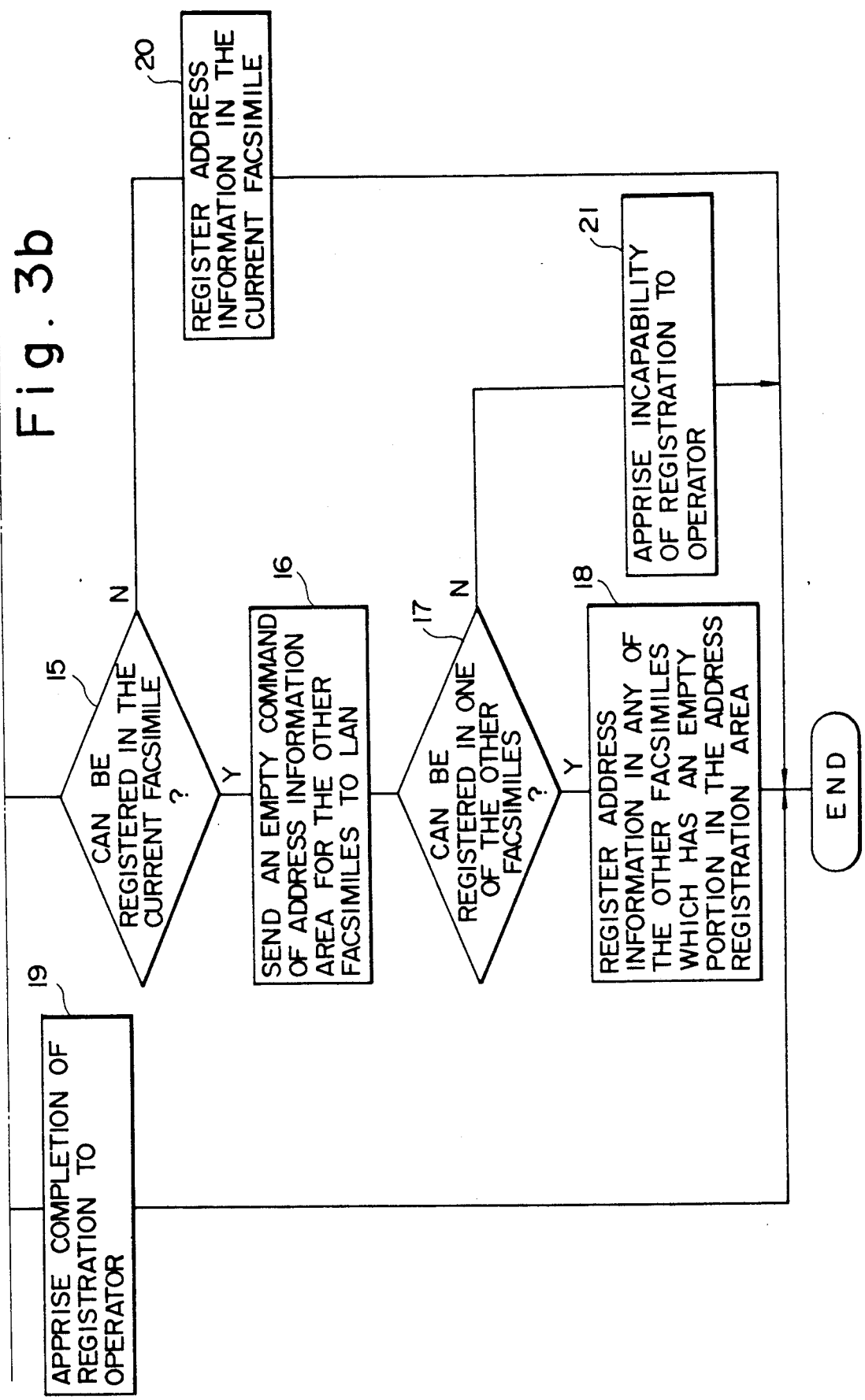

LAN INTERFACED FACSIMILE MACHINE

BACKGROUND OF THE INVENTION

1. Field of the Invention

This invention generally relates to a facsimile machine, and, in particular, to a LAN interfaced facsimile machine which is operatively connected to one or more associated facsimile machines through a local area network (LAN).

2. Description of the Prior Art

In modern facsimile machines, the number of telephone numbers to be registered for one-touch dial operation has increased. Thus, in such modern facsimile machines, it is required to provided a memory device having a relatively large capacity. This is not advantageous because the provision of such a large capacity memory device could significantly push up the cost. This disadvantage stems from the fact that each prior art facsimile machine was constructed to use its own memory device.

SUMMARY OF THE INVENTION

In accordance with the present invention, there is provided a facsimile machine which may be interfaced with another facsimile machine through a local area network (LAN). Thus, the present facsimile machine includes a LAN interface unit through which information, such as address information and image information, may be transmitted to any other associated facsimile machine connected through a local area network. The present facsimile machine is also connected to one or more facsimile machines through a telephone network so that various information may be transmitted to one or more facsimile machines through the telephone network.

The present facsimile machine also includes a memory device, and if its memory device is full, further information is transmitted to one or more other facsimile machines through the local area network and have the further information stored in the memory device of one or more other facsimile machines. If one of the associated facsimile machines connected through a local area network has received image information having an address to a particular facsimile machine, the image information is transmitted to that particular facsimile machine through a local area network. Address information may also be stored in the memory device of any of the other facsimile machines connected through a local area network and the address information may be transferred between any two or more memory devices of the facsimile machines connected by a local area network.

It is therefore a primary object of the present invention to obviate the disadvantages of the prior art as described above and to provide an improved facsimile machine.

Another object of the present invention is to provide an improved facsimile machine having a LAN interface function.

A further object of the present invention is to provide a system of facsimile machines having a common memory function.

A still further object of the present invention is to provide an improved facsimile machine whose memory capacity is minimized.

Other objects, advantages and novel features of the present invention will become apparent from the following detailed description of the invention when considered in conjunction with the accompanying drawings.

BRIEF DESCRIPTION OF THE DRAWINGS

FIG. 3 is an illustration showing how to combined FIGS. 3a and 3b;

FIGS. 3a and 3b, when combined as shown in FIG. 3, define a flow chart showing a sequence of steps useful for understanding the operation of the present facsimile machine.

DESCRIPTION OF THE PREFERRED EMBODIMENTS

Figure 1:
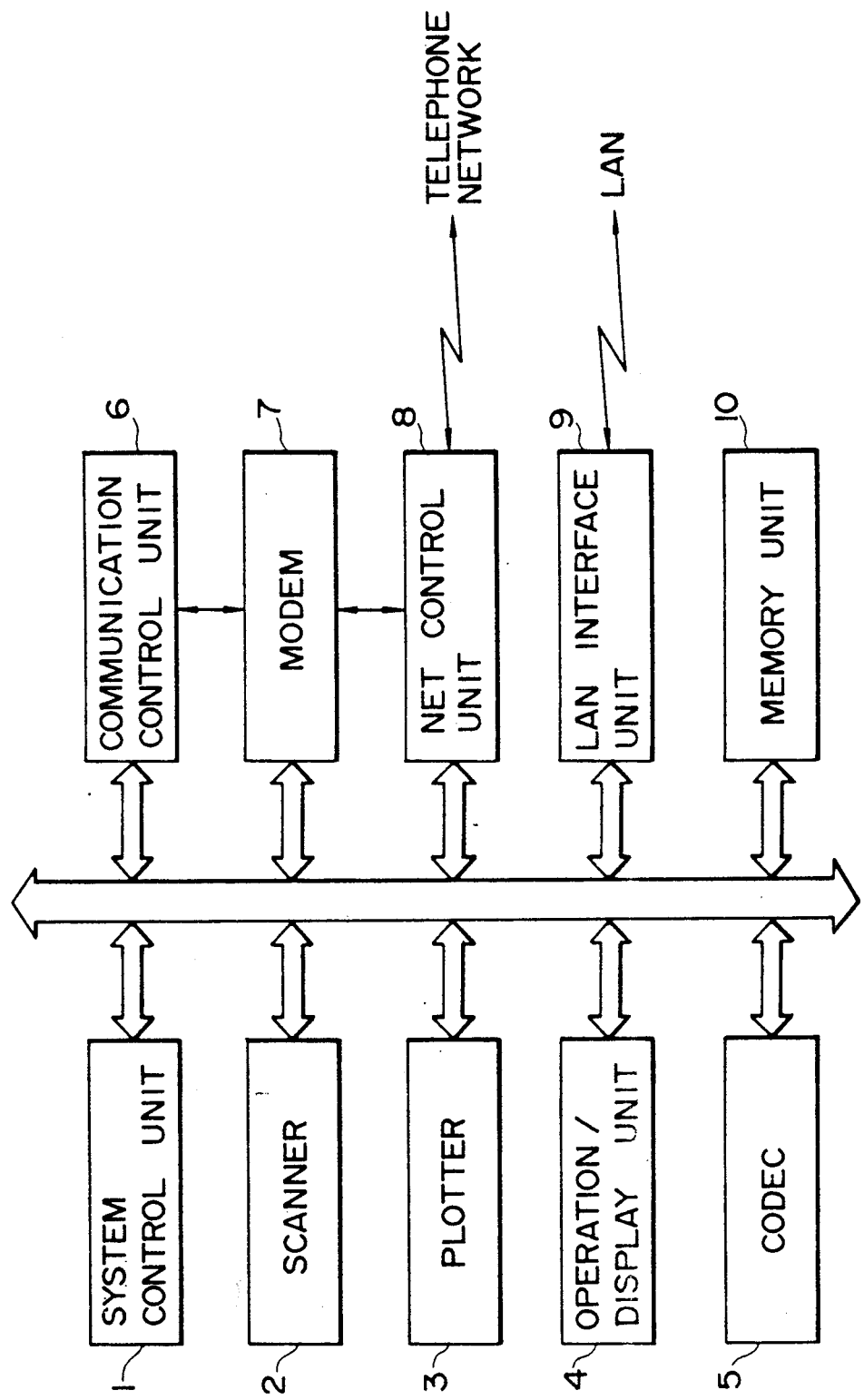
FIG. 1 is a block diagram showing the overall structure of a facsimile machine constructed in accordance with one embodiment of the present invention.

Referring now to FIG. 1, there is shown in block form a facsimile machine constructed in accordance with one embodiment of the present invention. As shown, the present facsimile machine includes a system control unit 1 incorporating therein a CPU, a scanner 2, a plotter 3, an operation/display unit (control panel) 4, a codec 5, a communication control unit 6, a MODEM 7, a net control unit 8 connected to a telephone network, a LAN interface unit 9 connected to a local area network (LAN) and a memory unit 10.

According to a prior art approach, when desired information, such as address information, is to be registered in the facsimile machine, the operator inputs information, such as address information, through the operation/display unit 4 and the information thus input is stored in the memory unit 10. When transferring image information, image information is input through the scanner 2 and encoded by the codec 5 and the thus encoded image information is temporarily stored in the memory unit 10. Then, the image information is read out from the memory unit 10 and processed through the communication control unit 6, MODEM 7 and the net control unit 8 to a destination facsimile machine through the telephone network. In reception, the received image information is processed through the net control unit 8, MODEM 7 and communication control unit 6 and it is decoded by the codec 5 to restore the original image information which is then supplied to the plotter 3. In this manner, in accordance with the prior art, since every information is stored in the memory unit 10, a relatively large capacity is required for the memory unit 10.

Figure 2:
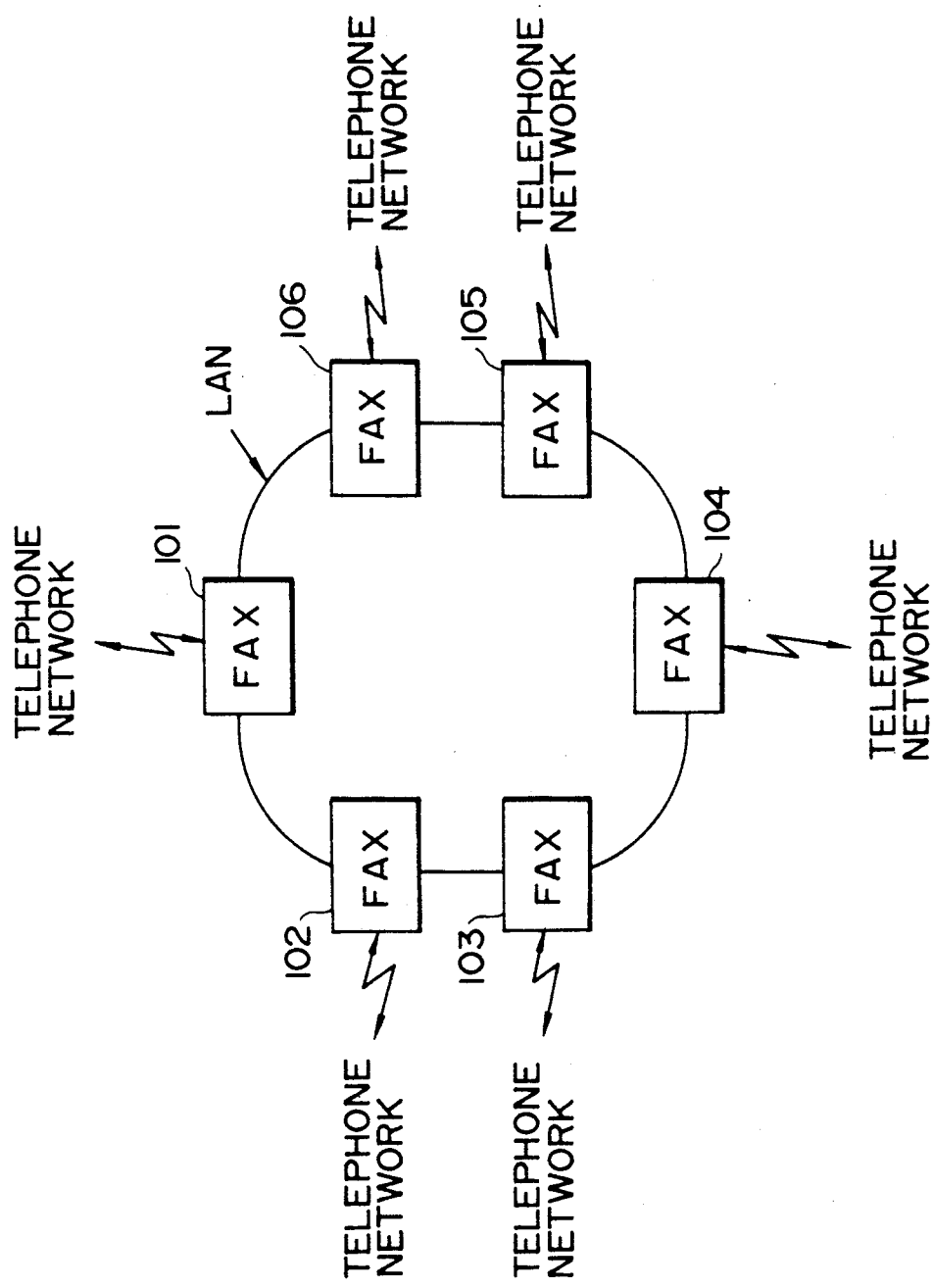
FIG. 2 is an illustration showing a system of facsimile machines connected by a local area network in the form of a loop in accordance with one embodiment of the present invention.

In accordance with the present invention, the LAN interface unit 9 is provided in the present facsimile machine as shown in FIG. 1, and two or more such facsimile machines 101 through 106 each having the structure shown in FIG. 1 are connected by a local area network (LAN) as shown in FIG. 2. With this structure, each of the facsimile machines 101 through 106 has its selected units, such as plotter 3, memory unit 10, communication control unit 6, MODEM 7 and net control unit 8, shared with the remaining facsimile machined connected by the LAN. Thus, each of the facsimile machines 101 through 106 can expand its function beyond that of a stand alone device.

For example, if the memory area for storing address information for one touch dialing operation is full at the facsimile machine 101 in the structure shown in FIG. 2, additional address information can be stored in one or more of the remaining facsimile machines 102 through 106 which are connected to the facsimile machine 101 through LAN if there is any empty section in any of the memory area of these facsimile machines. In addition, address information may be commonly used by any of the facsimile machines 101 through 106 which are connected by LAN so that it is not necessary to store the address information of a particular destination station at each of these facsimile machines 101 through 106. Thus, duplication in storing the same address information can be avoided.

Figure 4:
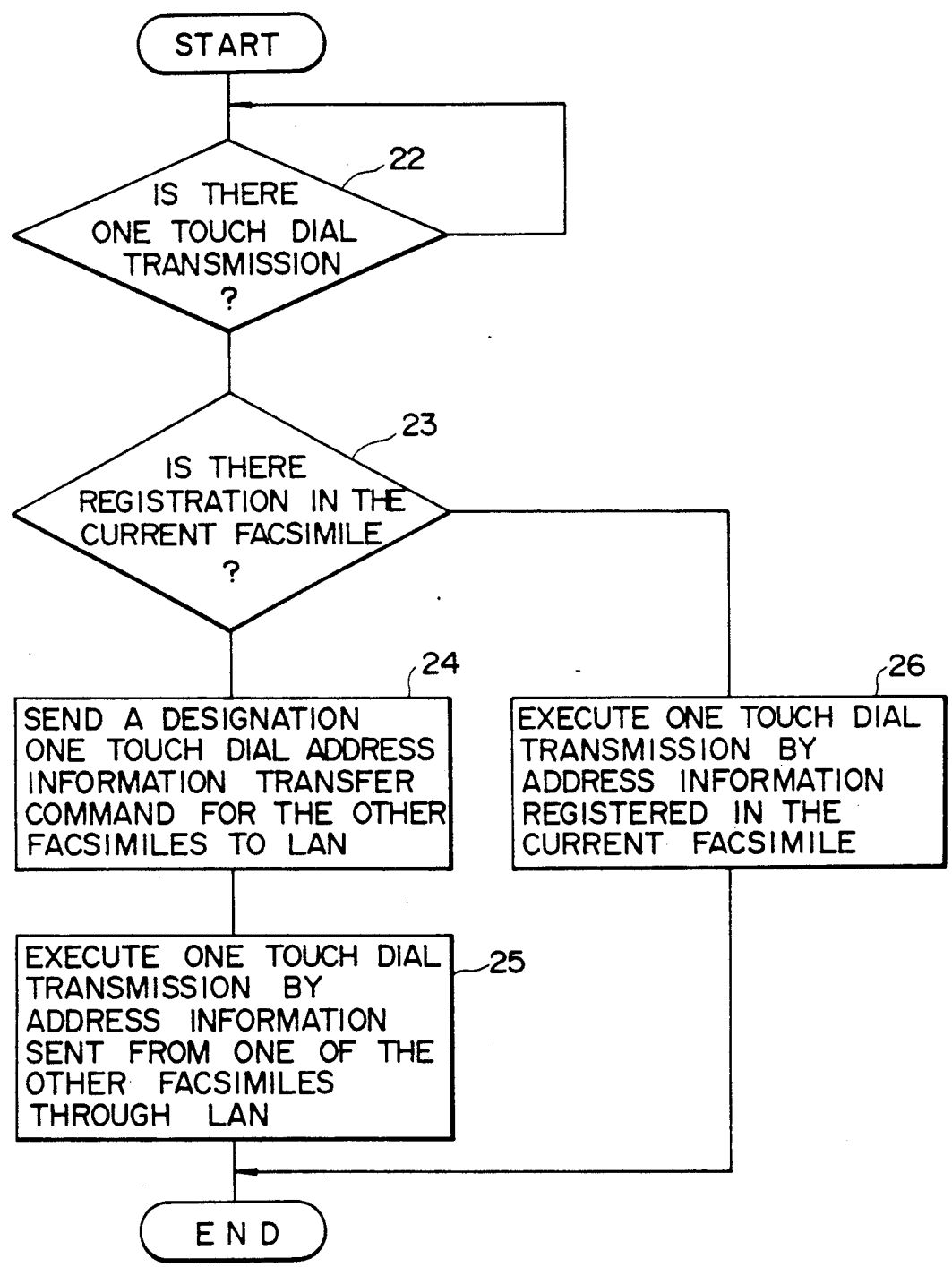
FIGS. 4 through 6 are flow charts which are also useful for understanding the operation of the present facsimile machine.

Now, with reference to the flow charts shown in FIGS. 3 and 4, the operation of the present facsimile machine will be described below. In the first place, if a one touch dial registration operation is carried out at the facsimile machine 101 (step 11), the current facsimile machine 101 checks to see if the same address has already been registered therein (step 12). If the same address has already been registered in the current facsimile machine 101, its fact is displayed at an operation panel for the operator (step 19). On the other hand, if it has been found that the same address has not been registered, a same address registration presence/absence confirmation command is supplied to the other facsimile machines 102 through 106 connected by LAN (step 13). In this case, for example, this command is supplied to all of the other facsimile machines connected by LAN using a global address.

Then, it is determined whether or not the same address has already been registered in any of the remaining facsimile machines 102 through 106 in accordance with a response to the same address registration presence/absence confirmation command from each of the remaining facsimile machines 102 through 106 (step 14). If the same address has already been registered in any of the remaining facsimile machines 102 through 106, its fact is indicated in the operation/display unit 4 to the operator (step 19). On the other hand, if the same address has not been registered in any of the remaining facsimile machines 102 through 106, it is examined whether or not that address can be registered in the current facsimile machine (step 15). And, if it has been found that the address can be registered, it is registered in the current facsimile machine (step 20). On the other hand, if it has been found that it cannot be registered, an empty address information registration area confirmation command is supplied to the remaining facsimile machines 102 through 106 (step 16). In this case, also, the command is supplied to each of the remaining facsimile machines using a global address.

In accordance with a response to the empty address information registration area confirmation command from each of the remaining facsimile machines 102 through 106, it is examined whether or not address information can be registered in the address information registration area of any of the remaining facsimile machines 102 through 106 (step 17). If the address information cannot be registered in any of the remaining facsimile machines 102 through 106, the indication of registration impossible is made to the operator (step 21). On the other hand, if the address information can be registered, the address information is transferred to any one of the remaining facsimile machines in which the address information can be registered (step 18).

If there has been a request for one touch dialing transmission operation at the current facsimile machine 101 (step 22), then it is examined whether or not one touch dial address information is registered therein (step 23). If the one touch dial address information is registered in the current facsimile machine 101, a one touch dial transmission operation is carried out in accordance with such address information (step 26). On the other hand, if such address information is not registered in the current facsimile machine 101, then an address information transfer command for a designated one touch dial is supplied to each of the remaining facsimile machines 102 through 106 which are connected by LAN (step 24). And, then, in accordance with the address information transferred from any of the remaining facsimile machines 102 through 106 in response to the address information transfer command, a one touch dial transmission operation is carried out (step 25).

As described above, by sharing each of the memory units 10 by the facsimile machines 101 through 106 connected by LAN, the memory units 10 can be used effectively and efficiently.

In the case where the memory unit 10 is full because for example of time designated transmission during image transmission, the image information supplied from the scanner 2 is encoded by the codec 5 and then transferred to any of the remaining facsimile machines 102 through 106 through the LAN interface unit 9 to be stored in the memory unit 10 thereof. And, then, the image information is transmitted to a destination facsimile machine through the communication control unit 7, MODEM 7 and net control unit 8 of that facsimile machine.

Figure 5:
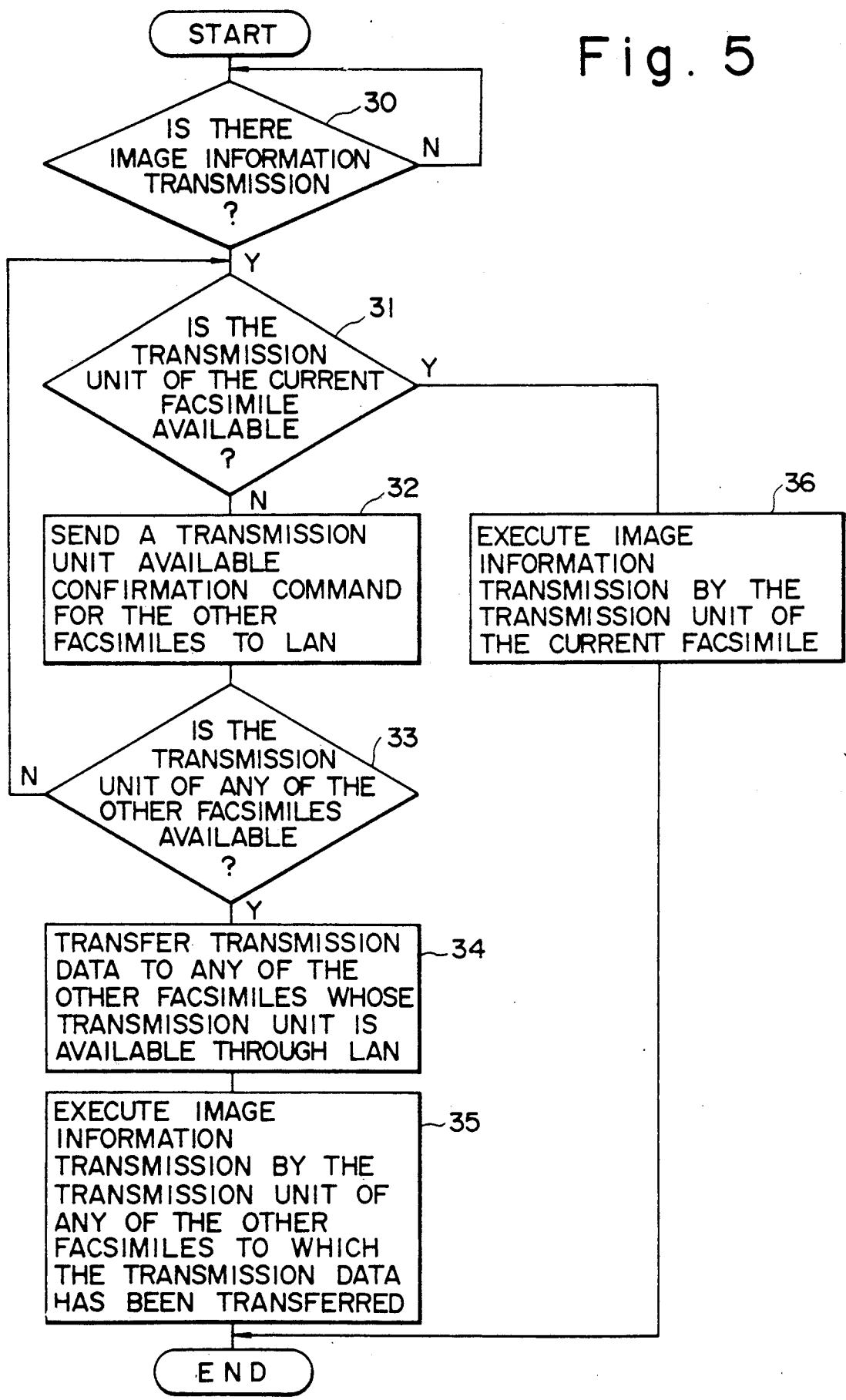
Figure 6:
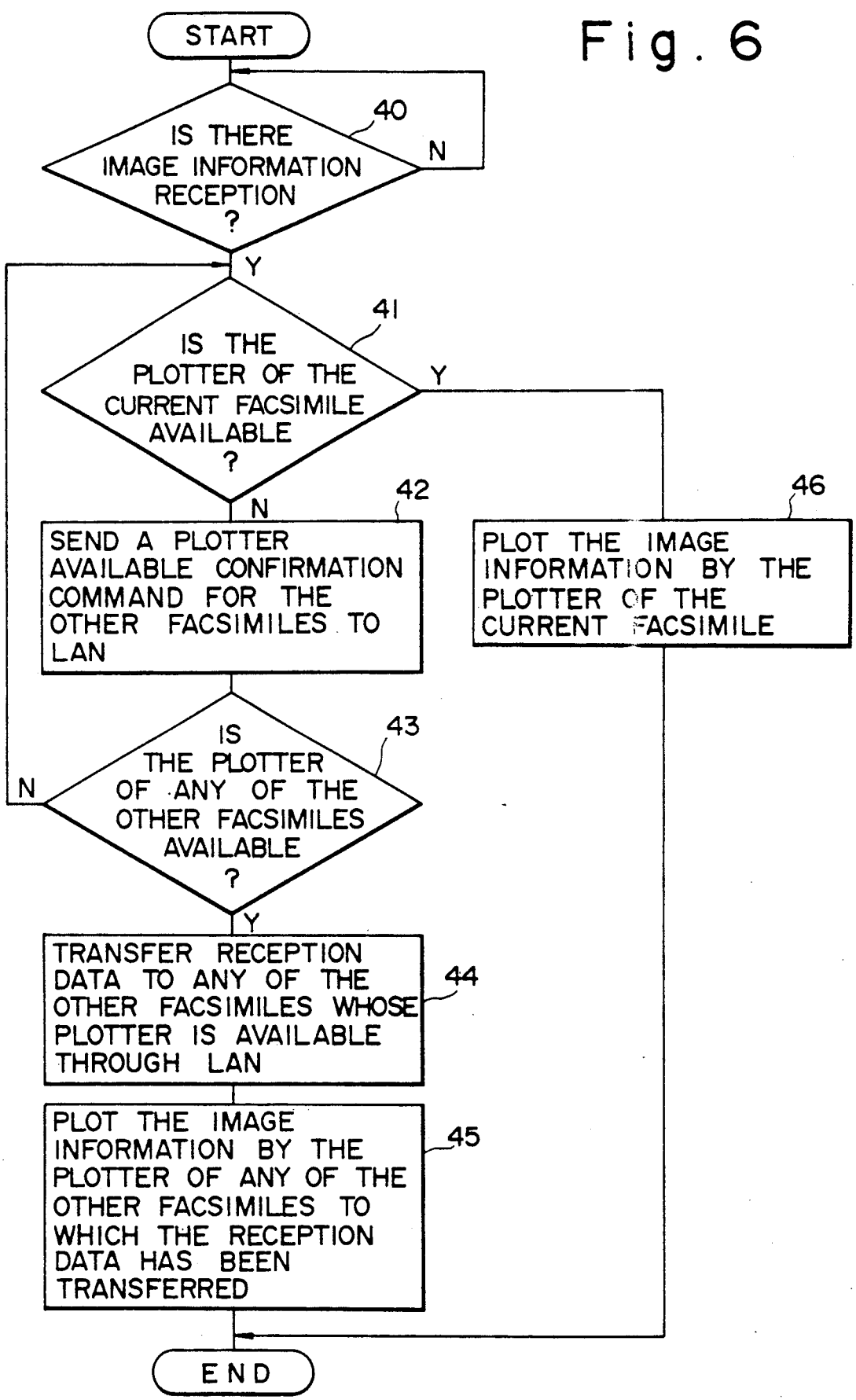

During reception, even if a plot impossible condition has occurred in one of the facsimile machines 101 through 106 which has been receiving image information for example due to failure of its plotter 3, the image information thus received is transferred to any of the remaining facsimile machines 101 through 106 which are connected by LAN and the received image information is recorded by the plotter 3 of that facsimile machine. One example of the above-described operation is illustrated in the form of flow charts in FIGS. 5 and 6.

As described above, in accordance with the present invention, a facsimile LAN system is defined by a plurality of facsimile machines provided with a LAN interface function with a shared memory unit system. Thus, the memory units 10 can be used most efficiently and effectively. The LAN interface unit 10 is now commercially available in the form of a chip and thus the present invention can be envisaged without difficulty. Therefore, the present facsimile machine includes a memory unit for storing information, such as image information or address information, and a communication means for carrying out communication through a network. The present facsimile machine also includes a LAN interface unit for interfacing with a LAN. Thus, the address information or image information may be transferred to any of the other facsimile machines of similar structure connected by LAN. In the present invention, the memory capacity of the memory unit of each of the facsimile machines can be reduced Moreover, even if the plotter fails, the received image data may be transferred to any other facsimile machine having an active plotter to have the image information recorded properly. In addition, a broadcasting operation can be carried out by all of the facsimile machines connected by LAN at the same time.

While the above provides a full and complete disclosure of the preferred embodiments of the present invention, various modifications, alternate constructions and equivalents may be employed without departing from the true spirit and scope of the invention. Therefore, the above description and illustration should not be construed as limiting the scope of the invention, which is defined by the appended claims.

What is claimed is:

1. A facsimile machine connected to a communication network and interfaced to a local area network (LAN), comprising:

storing means for storing information including address information of another facsimile machine connected to the communication network;

communicating means for communicating with another facsimile machine connected to the communication network through the communication network;

LAN interface means for interfacing with said another facsimile machine interfaced to the LAN through the LAN; and controlling means for controlling the operation of said facsimile machine, said controlling means including means for controlling transfer of said address information stored in said storing means to said another facsimile machine interfaced to said LAN through said LAN under a predetermined condition.

2. The facsimile machine of claim 1, wherein said controlling means controls retrieval of address information in any of facsimile machines connected to the LAN.

* * * * *